(12) United States Patent
Yocom et al.

(10) Patent No.: US 11,956,228 B2
(45) Date of Patent: Apr. 9, 2024

(54) METHOD AND APPARATUS FOR SECURELY MANAGING COMPUTER PROCESS ACCESS TO NETWORK RESOURCES THROUGH DELEGATED SYSTEM CREDENTIALS

(71) Applicant: DELINEA INC., Redwood City, CA (US)

(72) Inventors: Nathaniel Wayne Yocom, North Bend, WA (US); Sek-Hon Albert Leung, Los Altos, CA (US)

(73) Assignee: DELINEA INC., Redwood City, CA (US)

( * ) Notice: Subject to any disclaimer, the term of this patent is extended or adjusted under 35 U.S.C. 154(b) by 0 days.

(21) Appl. No.: 18/307,596

(22) Filed: Apr. 26, 2023

(65) Prior Publication Data

US 2023/0262052 A1  Aug. 17, 2023

Related U.S. Application Data

(63) Continuation of application No. 17/244,192, filed on Apr. 29, 2021, now Pat. No. 11,706,209.

(51) Int. Cl.
*H04L 29/06* (2006.01)
*H04L 9/40* (2022.01)

(52) U.S. Cl.
CPC .................................. *H04L 63/083* (2013.01)

(58) Field of Classification Search
CPC ... H04L 63/104; H04L 63/085; H04L 63/083; H04L 63/105; H04L 63/102; G06F 21/604
See application file for complete search history.

(56) References Cited

U.S. PATENT DOCUMENTS

| | | | | |
|---|---|---|---|---|
| 8,316,237 B1* | 11/2012 | Felsher | ................. | H04L 63/061 380/282 |
| 10,320,844 B2* | 6/2019 | Vincent | ............... | H04L 67/1097 |
| 10,791,145 B2* | 9/2020 | Bryan | ..................... | H04L 63/20 |
| 2007/0171921 A1* | 7/2007 | Wookey | ................. | H04L 63/10 707/E17.013 |
| 2008/0076413 A1* | 3/2008 | Jones | .................... | H04L 63/102 455/432.3 |

(Continued)

FOREIGN PATENT DOCUMENTS

| | | |
|---|---|---|
| EP | 2761522 A2 | 8/2014 |
| WO | 2015/199741 A1 | 12/2015 |

OTHER PUBLICATIONS

European Search Report and Search Opinion received for EP Patent Application No. 22170962.9, dated Sep. 21, 2022, 9 pages.

(Continued)

*Primary Examiner* — Khalid M Almaghayreh
(74) *Attorney, Agent, or Firm* — WOMBLE BOND DICKINSON (US) LLP

(57) ABSTRACT

A system and method for granting access to network resources through access credentials given to an agent process running on each computer or machine where resource requesters reside. The system extends a traditional token-granting authorization system to the agent processes, where each agent has administrative access to machine information. The agent uses that access to acquire detailed information about resource requesters. Requester qualifications defined by the system limit requester access to resources, and are enforced both by the agent and by the central system on the network resource server. Resource requesters ask for a token for resource use from the agent, not the central system. The agent uses its credentials to get a token from the central system and then return the token to qualified requesters.

17 Claims, 8 Drawing Sheets

(56) References Cited

U.S. PATENT DOCUMENTS

| | | | |
|---|---|---|---|
| 2009/0002333 A1* | 1/2009 | Maxwell | G06F 21/36 |
| | | | 382/209 |
| 2009/0228967 A1* | 9/2009 | Gbadegesin | H04L 63/0807 |
| | | | 726/8 |
| 2011/0251992 A1* | 10/2011 | Bethlehem | H04L 67/141 |
| | | | 707/610 |
| 2013/0086645 A1 | 4/2013 | Srinivasan et al. | |
| 2014/0215590 A1* | 7/2014 | Brand | G06F 9/5072 |
| | | | 726/6 |
| 2015/0046971 A1* | 2/2015 | Huh | H04L 9/3213 |
| | | | 726/1 |
| 2016/0088026 A1* | 3/2016 | Mohamad Abdul | G06F 8/65 |
| | | | 726/1 |
| 2018/0097787 A1* | 4/2018 | Murthy | H04L 63/08 |
| 2018/0097788 A1* | 4/2018 | Murthy | H04L 63/102 |
| 2018/0097789 A1* | 4/2018 | Murthy | H04L 63/0227 |
| 2019/0158503 A1* | 5/2019 | Bansal | H04L 63/0272 |
| 2019/0208450 A1* | 7/2019 | Zait | H04W 36/30 |
| 2019/0342284 A1* | 11/2019 | Vohra | H04L 63/029 |
| 2019/0356542 A1* | 11/2019 | Chamarajnager | H04L 63/0823 |
| 2019/0386981 A1* | 12/2019 | Ramesh Kumar | H04L 9/3228 |
| 2021/0392142 A1* | 12/2021 | Stephens | H04L 63/104 |

OTHER PUBLICATIONS

International Search Report and Written Opinion received for PCT Patent Application No. PCT/US2022/027060, dated Sep. 2, 2022, 6 pages.

* cited by examiner

Resource Access Through a Shared Account

Resource Access Through Individual Accounts

METHOD AND APPARATUS FOR SECURELY MANAGING COMPUTER PROCESS ACCESS TO NETWORK RESOURCES THROUGH DELEGATED SYSTEM CREDENTIALS

BACKGROUND

Computer processes such as applications or executing scripts typically run on network-connected machines, which may be physical or virtual computers. These processes often need to access network resources provided by a network resource server. Network resources often contain confidential information that cannot be made public, so the service protects the resources through security measures, typically a set of different accounts that each define what entities have access to the secure network resources. Examples of secure network resource servers include cloud services that provide confidential personal information or local network directory servers that provide confidential network access information.

Each network resource service account specifies a different set of secure identifiers—login credentials such as a username and password or more extensive identity information. Login credentials are necessary to log into the account. A process requesting a secure resource must supply the appropriate login credentials for an account that has access to that resource. The network resource server will then authenticate the requester by comparing the supplied login credentials to the account-specified login credentials. If they match, the server recognizes the requester as the identity defined in the account and grants the request.

To avoid repeating the full authentication procedure with each subsequent access request, the network resource server and the requesting process typically use a standard access token. The access token is a structured collection of data defined by a security standard such as OAuth 2.0 which is an open source access delegation protocol typically used by one internet service to verify a logged-in user to access a second internet service without passing along authentication secrets such as passwords. The access token uniquely and securely identifies the bearer of the token as an authenticated and authorized requester of network resources and may also specify which resources the token bearer may access.

When a process wants to work with a network resource server, the process's first request is for an access token. After authenticating the process, the service issues an access token to the process. The requesting process then presents the access token with each subsequent resource request, and the server grants access after inspecting the token without repeating the full authentication procedure. Many processes are human-driven: that is, a human runs the process and responds to the process's prompts for information. When a human-driven process requests a secure network resource, the process can prompt the human for the necessary account login information such as a username and password to authenticate the process with the network resource service.

Many other processes, however, are autonomous processes that execute independently of human participation. These processes have no human to supply login information, and must use other methods for login. An example of these autonomous processes include machine startup scripts that run when a machine first starts and must integrate itself into the network. The script must request information and objects from a secure network resource server set up to serve confidential resources necessary for machine startup. Examples of those secure resources include access control lists, security keys for SSH (secure shell) access, and security secrets for accessing other network resource services such as Amazon Web Services or GitHub.

Another example of autonomous processes are services and microservices running on cloud platforms that must access secure resources on the platform. To get access, these services and microservices request security secrets from the network resource server.

Current practice is typically to set up an account in the network resource service specifically for autonomous processes to use. When such a process wants access to secure network resources, it presents login credentials for that account and, if this is for a series of requests, requests an access token in the name of that account. To supply the login credentials, the process must either store them internally, often as a plain text username and password, or have access to the credentials stored elsewhere where they might also be stored in plain text.

There are often many autonomous processes that need access to the same secure network resources. As an example, a cloud service might start up hundreds or thousands of machines to provide the service. Each of those machines must run one or more startup scripts and processes that contact the network resource server for secure resources before the machine can be integrated into the network.

One common solution for handling many such processes is to create a single account on the server that may be shared among the processes. All of the processes have or have access to the login credentials for the account, and can use the credentials to make requests and get access tokens from the server.

Another solution is to create many non-human accounts, one for each autonomous process. In a case where there are hundreds or thousands of autonomous processes, this requires setting up hundreds or thousands of unique accounts on the server.

Problems with Prior Art

When a computer process stores login credentials for a secure network resource, either within itself or externally, it presents a big security risk. Attackers can search scripts or executable files and use the login secrets they find there to access the secure service where they can steal confidential information and carry out malicious acts. Encrypted login credentials are harder to extract, but still possible with added effort.

Sharing an Account

If login credentials are shared among numerous processes, that information is typically stored in many locations, which greatly increases the risk exposure. If one process is compromised, access for all the other account-sharing processes is compromised. The account administrator might have to disable access for all processes sharing the account, which is difficult, and usually disrupts service for all those processes. The administrator may also have to change login credentials for all the processes.

Managing the login credentials for a shared account is cumbersome. If the credentials for a shared account change, which they should address a security breach as described above or as part of a frequent change policy to increase security, the credentials for all the processes that depend on that account must be updated. This is especially difficult if the credentials are embedded in scripts or executable files. Processes may then require a restart to use the new credentials. This can require revising thousands of scripts or executable files and then restarting thousands of processes, which—because of the difficulty—discourages frequent login changes, makes process implementation difficult, and creates a bigger security risk.

When a single account is shared among multiple processes, the network resource server has very little information about a process making a request using the shared account. The server sees the login credentials, but doesn't know what process type is using the account, where the process is running, who or what started the process, and a lot of other process context information that the server might use to tell if the process is qualified to use the account or not. The server cannot deny or narrow the scope of service for the account depending on the process making a request.

Individual Accounts

A network resource server may set up a separate account for each autonomous process that needs to use the server, but this is impractical for systems where thousands of processes may need their own accounts. It is difficult to set up those accounts, and distributing login credentials for all the accounts is equally difficult. The credentials must either be embedded separately in each script or executable file, or the system must set up a credential distribution system that is itself vulnerable to attack.

Setting up individual accounts is also impractical for elastic compute environments where virtual machines are created and destroyed automatically as the demand for machine resources increases or decreases. Accounts have to be created and destroyed automatically to match the appearance and disappearance of virtual machines, which is very difficult to accomplish.

Creating an Audit Trail

If a system is attacked, and secure network resources are compromised, it is important to be able to analyze that attack using information about where the attack originated, how the attack proceeded, and what the weak points were that allowed the attack. This requires information typically provided by an audit trail, a record of events that show steps in authentication, resource retrieval, and other important information. Prior art solutions provide every bit of information in an audit trail that consists primarily of when a process made a request, what it requested, and what credentials it provided for the request. It lacks information about process type, process context such as location and executing environment, and other important facts. It is very hard to analyze attacks and improve future security with a limited audit trail.

Prior Art Processes and Accounts

FIG. 1 shows a common method of providing network resource access without an embodiment of the invention where multiple computer processes share the same account.

A network resource server 11 provides access to secure resources through accounts 13 that each requires a unique set of login credentials 15. One or more autonomous computer processes 17 running singly or in numbers on one or more machines 19 may use a single account's login credentials 15 to request an access token 21 from the authentication service 23 running on the network resource service 11. The authentication service 23 checks the credentials 15 against the account 13, then if the credentials 15 are good, it issues an access token 21 under the authority of the account 13. The autonomous computer process 17 receives the access token 21, which it then uses in later requests to access secure resources provided by the network resource server 11.

The autonomous computer processes 17 all use the same account login credentials 15 so there are many copies of the account login credentials 15 in many locations in one or more networks. Although this figure shows three separate autonomous computer processes 17 sharing a single account 13, in practice the autonomous computer processes 17 can number in the hundreds, thousands, or more, each with access to a set of login credentials 15 for a single account 13.

FIG. 2 shows another common method of providing network resource access without an embodiment of the invention where multiple computer processes each have their own account.

A network resource server 11 provides access to secure resources through accounts 13 that each requires a unique set of login credentials 15. One or more autonomous computer processes 17 running singly or in numbers on one or more machines 19 each have their own account 11 and each have unique login credentials 15 for their account 11. They use those login credentials 15 to request an access token 21 from the authentication service 23 running on the network resource server 11. The authentication service 23 checks the credentials 15 against the authority of the autonomous computer process's 17 unique account 13, then if the credentials are good, it issues an access token 21 under the authority of the autonomous computer process's 17 unique account 13. The autonomous computer process 17 receives the access token 21, which it then uses in later requests to access secure resources provided by the network resource server 11.

The autonomous computer processes 17 each have a unique account 13 and login credentials 15, which require setup each time a new autonomous computer process 17 needs access to secure resources on the network resource server 11, and which require removal each time an autonomous computer process 17 no longer requires access. Although this figure shows three separate autonomous computer processes 17, each with unique accounts 13, in practice the autonomous computer processes 17 can number in the hundreds, thousands, or more, and may appear and disappear at unpredictable times and in unpredictable numbers as virtual machines 19 are created or destroyed in elastic cloud computing environments.

SUMMARY OF THE INVENTION

Embodiments of this invention extend a network resource server's access token distribution to a long-lived agent process running on each machine where other processes may wish to use secure resources offered by the server. Each agent of the embodiment has access to administrator-level operating information on its machine so that the agent can identify and monitor any processes requesting a token from the server. The agent grants tokens, which are standard access tokens such as OAuth 2.0 tokens used in prior art, only to qualified processes. The agent reports to the server information about those processes and the agent's transactions with those processes. This provides much greater visibility and control of requesting processes than prior art provides.

An embodiment of the invention creates a service account on the network resource server for each machine where an agent runs. The embodiment also defines subsets of the network resources on the server that processes may use, and further defines process qualifications that are necessary to use each of the defined resource subsets. The embodiment does not need to create an account for each process that may want to use network resources because accounts are needed only on a machine basis, so it requires far fewer accounts and is easier to manage than prior art that uses a server account for each process using the server. Because the embodiment uses an account for each machine enrolled by the embodiment, the embodiment may restrict access by a single machine without restricting access by other machines.

An embodiment of the invention starts an agent on each enrolled machine. A machine may be a physical computer, a virtual computer running on another computer, or any other environment where computer processes may run. When an embodiment starts an agent on a machine, the embodiment gives the agent the login credentials to a corresponding service account set up for the machine on the network resource server. The agent stores those machine credentials and uses them to log into the server to get access tokens, to report local process qualifications and interactions, and to otherwise integrate itself with the server. Processes wishing to use the network resource server request a token from the agent and do not need to log into the server, so there is no need to provide login credentials to the processes as the prior art does. This eliminates a serious security risk.

An embodiment of the invention provides to the agent definitions of resource subsets and accompanying process qualifications for each subset's use. When a process running on an agent's machine wants to access secure resources on the network resource server, the process does not contact the server to request an access token, but contacts the agent instead and requests access to one of the resource subsets. The agent determines the type of the process making the request, and looks at the conditions in which the process is running: time of day, what started the process, and other conditions. The agent then compares that process information to the process qualifications for the resource subset to determine if the process is qualified. The restrictions provided by the resource subsets and process qualifications provide a much finer control over resource access than the prior art does, which has no machine-specific information about requesting processes and often cannot distinguish between requesting processes or even the machines on which they run.

If the process meets the qualifications for the requested subset, the embodiment's agent uses its login credentials to authenticate itself with the embodiment's network resource server. The agent requests from the server an access token for the process and reports full information of the agent's transaction with the process. That information includes information about the process qualifications, which effectively identify the process. The server returns an access token to the agent and records the qualifications of the process making the request. The server associates those qualifications—and therefore the process identity—with the token. This token identity association makes it possible for the server to know precisely which process is making a request using the token, while the prior art allowing multiple processes to use a single server account does not. Because an embodiment of the invention uses a single server account to issue tokens to all processes requesting them on a machine, it allows many processes to effectively use a single machine account while retaining full security over individual processes, which the prior art does not.

The embodiment's agent receives the token from the network resource server and gives the token to the requesting process. The process may then use the token to request resources directly from the server for as long as the token is valid. Whenever the server receives a request using a token, it checks token records to make sure the requesting process is permitted to request the resource. If it is not permitted, the request is denied. The server may at any time restrict resource use beyond what is permitted by a token.

The embodiment's agent as it runs reports full information to the network resource server about the agent's transactions with processes running on its machine whether the transactions succeed or not. This creates an audit trail for security purposes. The server may also request other information from the agent about processes on the agent's machine. This information helps the server use timely local machine information to determine if a requesting process is misbehaving or has become a security risk. This access to machine-level process information makes embodiments of the invention much more secure than prior art.

BRIEF DESCRIPTION OF THE DRAWINGS

Embodiments of the invention are illustrated by way of example and not by way of limitation in the figures of the accompanying drawings in which like references indicate similar elements. Note that references to "an" or "one" embodiment in this disclosure are not necessarily to the same embodiment, and such references mean "at least one."

DETAILED DESCRIPTION OF THE INVENTION

An embodiment of the invention operates within a network resource server and within multiple machines requesting resources from the network resource server. Although not expressly specified on the drawings, each network resource server 11 and each machine 19 include a processor, a memory, and other elements required for proper operation of a computer. Since the specifics of such elements are well known in the art and are not necessary for a proper understanding of the invention, such specifics are not expressly disclosed herein.

Machine Components

Figure 1:
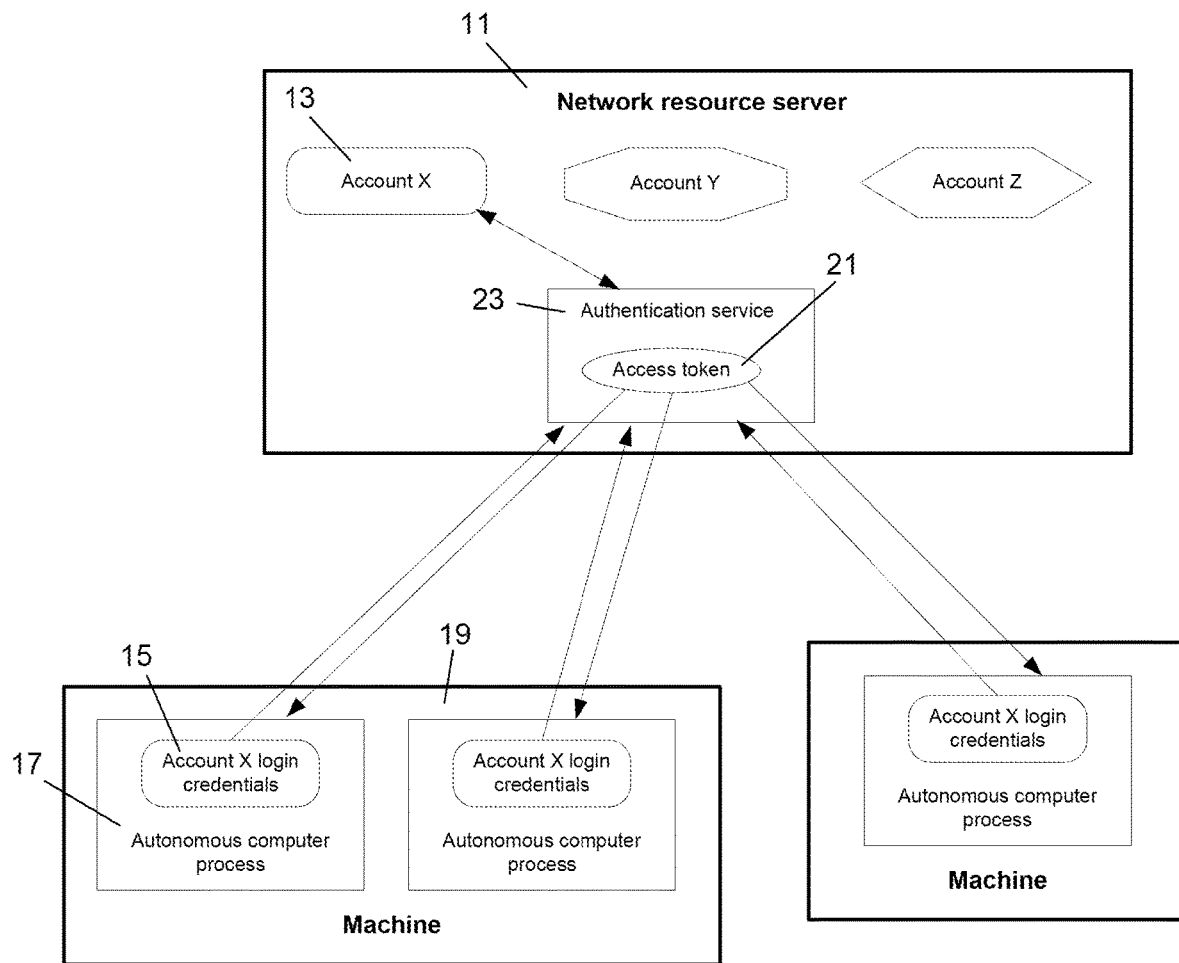
FIG. 1 is a block diagram that shows the components of a prior art method of providing access to secure network resources through a single account. That account is shared among multiple autonomous computer processes that access a network resource server.
Figure 2:
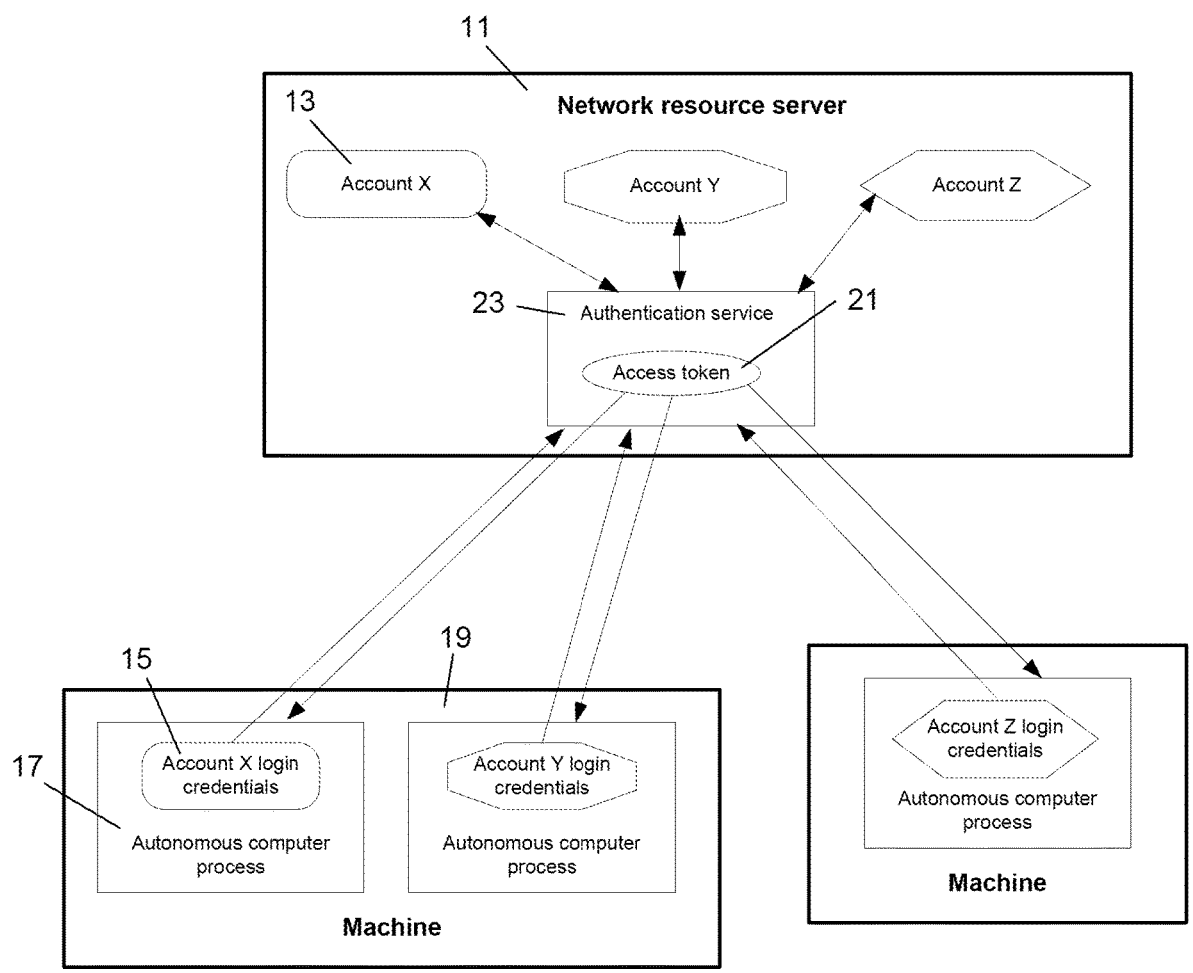
FIG. 2 is a block diagram that shows the components of a prior art method of providing access to secure network resources through a unique account for each autonomous computer process that accesses a network resource server.
Figure 3:
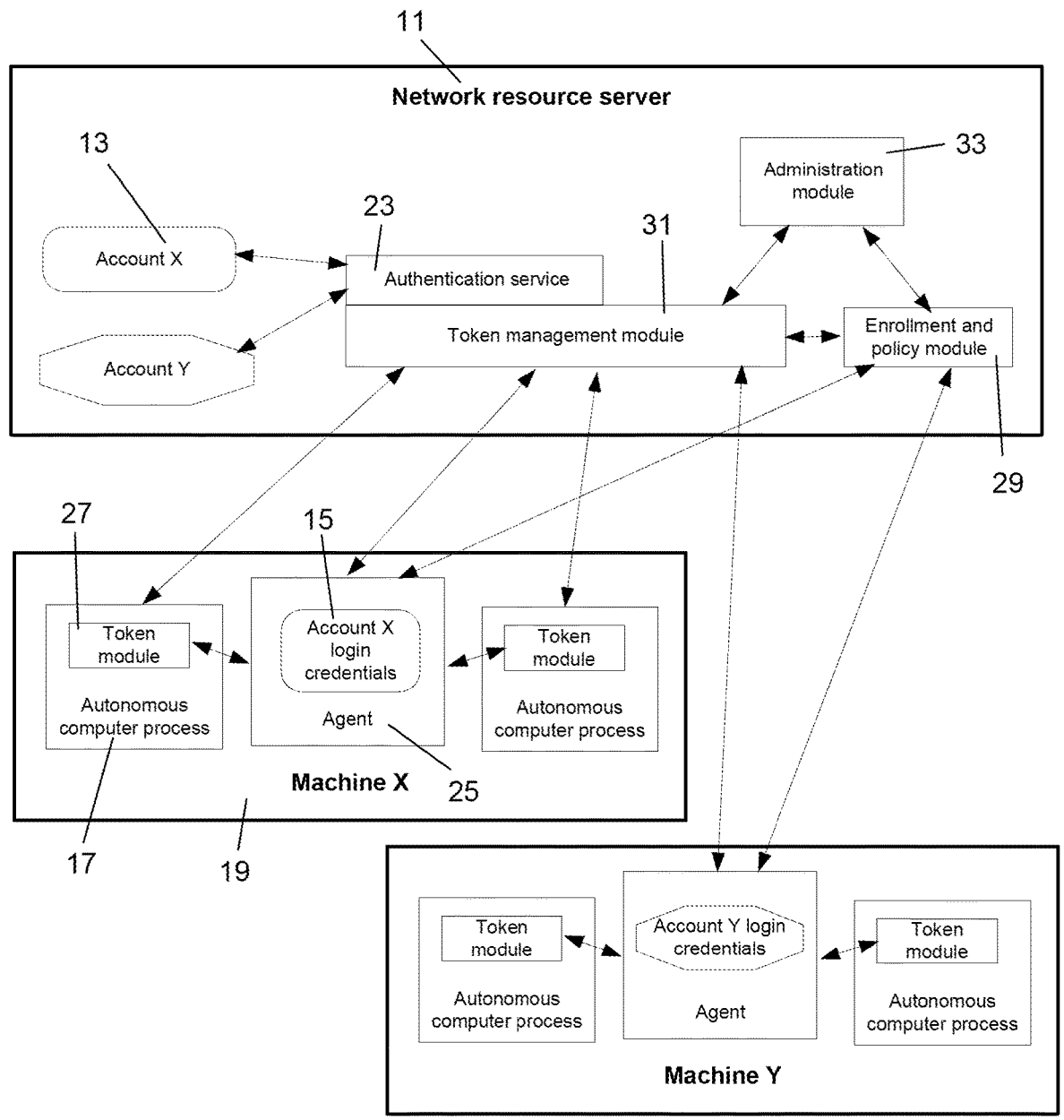
FIG. 3 is a block diagram that shows the components of an embodiment of the invention as they exist in a network resource server and in multiple machines that request resources from the server.

FIG. 3 shows the embodiment's components running within each machine 19 that requests resources from the network resource server 11. Two types of embodiment components run on each machine 19:

A single agent 25 runs as a long-lived process such as a daemon. It has administrator-level permissions that provide detailed information about the machine 19 and all the autonomous computer processes 17 running there. In this embodiment of the invention, the agent 25 handles enrolling the machine 19 with the invention components running on the network resource server 11. Other embodiments of the invention may set up enrollment functions to run in a separate process. The agent 25 also accepts requests for access tokens from autonomous computer processes 17 running on the machine.

A token module 27 is a code block contained within each autonomous computer process 17. It contains the logic necessary to contact and work with the agent 25, including logic for requesting access tokens.

Network Resource Server Components

FIG. 3 also shows the embodiment components that run on the network resource server:

The enrollment and policy module 29 defines and stores restriction definitions (policies) for the network resource server 11, and handles enrolling agents 15 and the machines 19 on which they run. The enrollment and policy module 29 receives enrollment requests from unenrolled agents 25, verifies each agent 25 and its request, and on successful verification creates an account 13 for the agent's machine 19. The enrollment and policy module 29 gives the agent 25 login credentials 15 for the machine account 13 along with policies that may apply to autonomous computer processes 17 using network resources. If policies change for a machine 19, the enrollment and policy module 29 pushes those policy changes to the agent 25 on the machine 19.

The token management module 31 is coupled with the network resource server's 11 authentication service 23. The module 31 uses the authentication service 23 to authenticate login credentials presented by the agents and by the enrollment policy module 29. The token management module 31 creates and distributes tokens 21 when requested by agents 25. The module 31 also receives tokens 21 presented in requests from autonomous computer processes 17 and agents 25. The token management module 31 works with the enrollment and policy module 29 to determine what policies apply to each token 21, and when presented with a token 21 in a request ensures that the request stays within the limits defined by the policy associated with the token 21. In other embodiments of the invention, the token management module 31 may replace the authentication service 23 completely and carry out all of its authentication services.

The administration module 33 provides an interface that allows an outside human user or process to control the embodiment of the invention by setting policies, specifying how enrollment works, viewing the reports and activities of other embodiment components, and performing other administrative duties. The administration module 33 may maintain a log of embodiment activities. The interface it provides may include a graphical user interface such as a console that a human user may use, or an application programming interface (API) that non-human processes may use.

In this embodiment of the invention, the embodiment components residing on the network resource server 11 are separate components. In other embodiments of the invention, these components may be combined or split to consolidate or distribute their functions to improve functionality.

Resource Access Components

Figure 4:
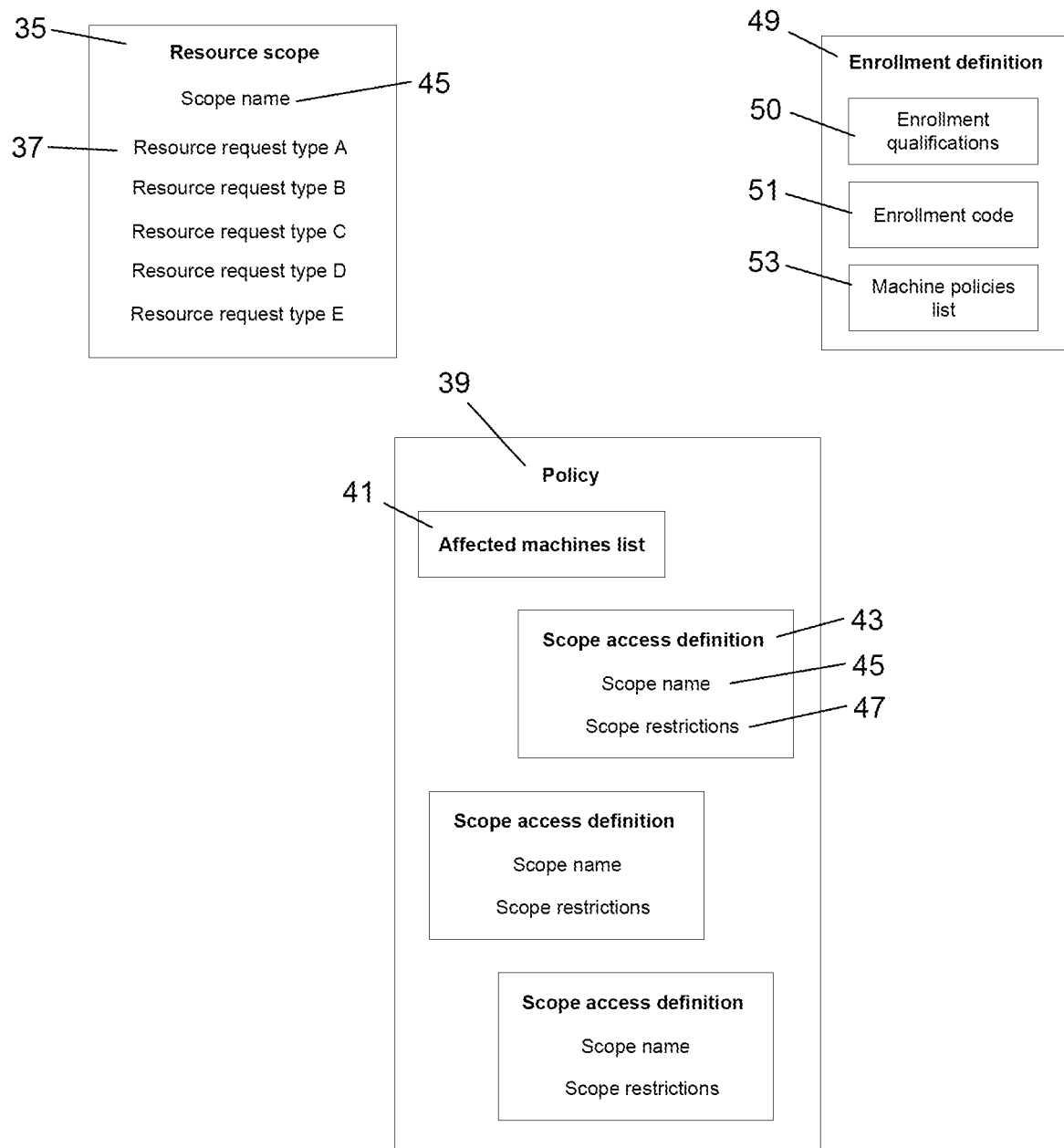
FIG. 4 is a block diagram that shows the components of an embodiment of the invention that define resource access through the network resource server.

FIG. 4 shows the components used by an embodiment of the invention to define autonomous computer processes' 17 access to resources offered by the network resource server 11.

A resource scope 35 is a list of resource request types 37 that each define a single way to request a resource from the network resource server 11. A resource request type is usually any one of many possible application programming interface (API) calls to the network resource server 11, but may be any other type of request for resources. The resource scope's 35 list of resource request types 37 defines a set of resources that may be used within a machine policy 39 to define resource access. The resource scope may also be used by an agent 25 or autonomous computer process 17 running on a machine 19 to restrict or request access to a group of resources. Each resource scope 35 has a unique scope name 45. As one example, a resource scope may have the following resource request types which may define a gateway to possible resources:

| Resource Request Type |
| --- |
| https://api.acme.com/directory GET |
| https://api.beta.com/catalog POST |
| https://blog.example.com POST |

A machine policy 39 defines resource access for one or more machines 19. Each machine policy contains two types of components:

The affected machines list 41 lists the machines 19 to which the policy 39 applies. When an embodiment of the invention changes a machine policy 39 definition, the embodiment can push those changes to affected machines 19.

One or more scope access definitions 43 each specify a scope name 45 that specifies a single resource scope 35. Each scope access definition 43 also specifies a set of scope restrictions 47 that together define the requirements that a requesting autonomous computer process 17 must meet before it is allowed to make any of the resource requests defined by the resource scope's 35 resource request types 37. Those requirements may include computer process type as defined by a checksum of the process's 17 executable file, the pathname where the executable file is located, a publisher and/or version number built into the process 17, the process's 17 executing conditions such as time of day, user context, IP address range, and many other attributes of a requesting process 17.

An enrollment definition 49 defines what machine policies 39 apply to a machine 19 when the machine 19 first enrolls with an embodiment of the invention. An enrollment definition 49 contains an enrollment code 51 and a set of enrollment qualifications 50 that define conditions that must be met for a successful enrollment. Enrollment qualifications 50 might specify an IP address range where an enrollment request originates, the type of process making the request, time of day when the request arrives, and any number of other conditions. The enrollment definition 49 also contains a machine policies list 53 that contains a list of machine policies 39 that may, for example, each define a different set of machines 19 along with the resources they may access and the requirements they must meet to access those resources.

A machine 19 enrolling with an embodiment of the invention presents an enrollment code 51. The embodiment finds the enrollment definition 49 that contains the enrollment code 51, checks to make sure that the requester meets the enrollment qualifications 50, and if so returns a set of machine policies 39 defined by the enrollment definition's 49 machine policies list 53. The agent 25 on the enrolling machine 19 uses the machine policies 39 it receives to enforce resource access by autonomous computer processes 17 running on the machine 19.

Enrolling a Machine

Figure 5:
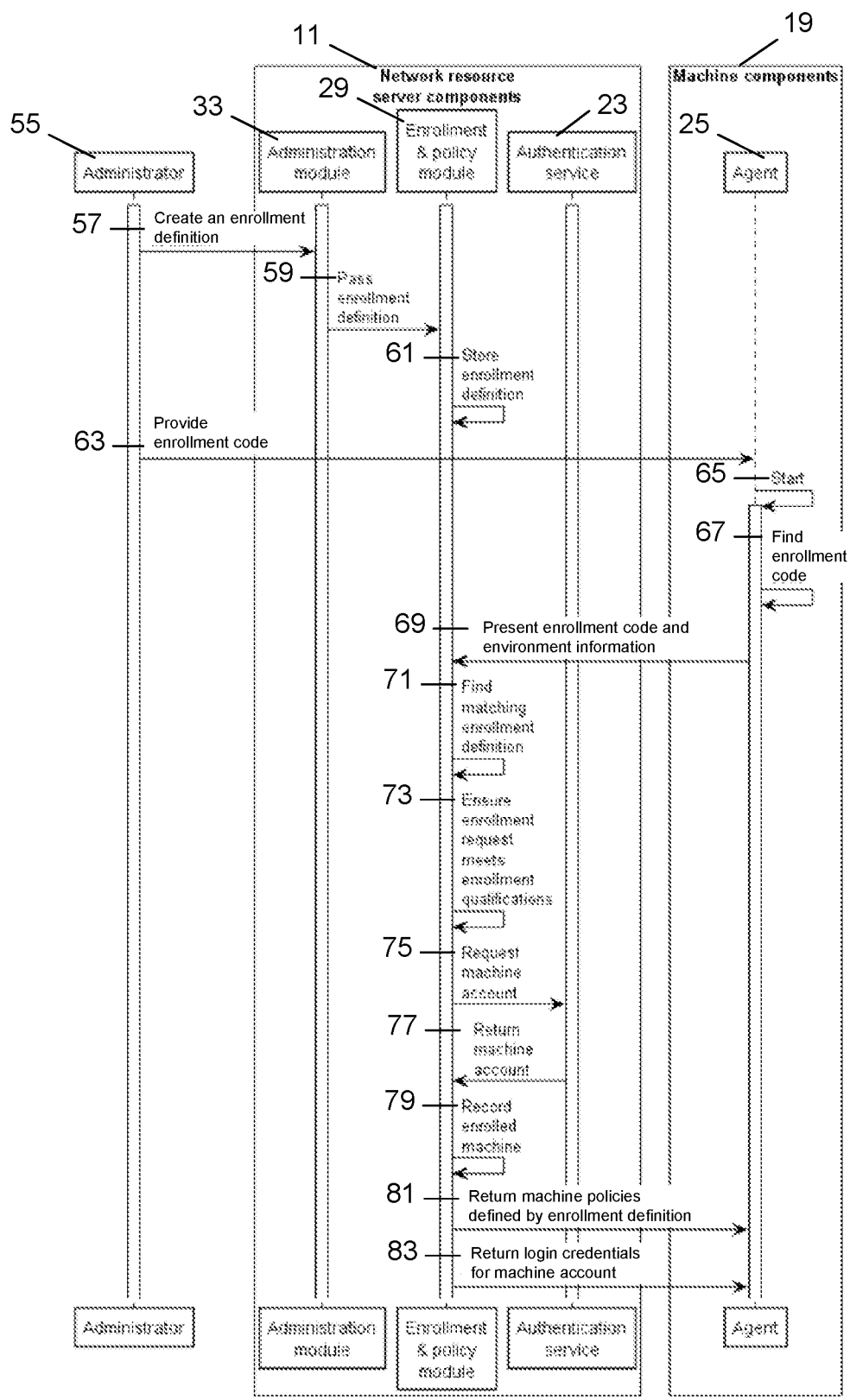
FIG. 5 is a sequence diagram that shows how an embodiment of the invention enrolls a machine.

FIG. 5 shows how an embodiment of the invention enrolls a machine 19. An administrator 55, which can be a human or a computer process, uses the administration module 33 to create 57 an enrollment definition 49 that specifies a unique enrollment code 51, a set of enrollment qualifications 50, and a machine policies list 53. The administration module 33 sends 59 the enrollment definition 49 to the enrollment and policy module 29, which stores 61 the definition 49.

The administrator also provides 63 the enrollment definition's 49 enrollment code 51 in a location where the agent 25 on a machine 19 can find the code 51 when necessary. The enrollment code 51 may be part of the agent's 25 executable file, it may be stored in a secure location known to the agent 25 so the agent 25 can retrieve the code 51, or made available to the agent 25 in other possible ways. The enrollment code 51 may also be provided 63 by a component other than the administrator 55 such as an independent process working to set up executing processes on new machines 19.

When the agent 25 starts 65, it finds 67 the enrollment code 51. Finding 67 the enrollment code 51 on agent 25 startup 65 typically occurs when machines 19 first boot up and start 65 the agent 25 as part of the boot-up process. Finding 67 the enrollment code 51 may also occur any time after agent 25 startup 65 when it is necessary to enroll the machine 19.

The agent 25 presents 69 the enrollment code 51 to the enrollment and policy module 29 along with pertinent information about the agent's 25 environment such as machine 19 specifics. The enrollment and policy module 29 finds 71 the enrollment definition 49 that matches the presented enrollment code 51. The module 29 ensures 73 the enrollment request is legitimate by checking the provided environment information against the enrollment qualifications 50 specified in the enrollment definition 49.

If the enrollment request is legitimate, the enrollment and policy module 29 requests 75 a machine account 13 from the authentication service for the machine 19 on which the enrolling agent 25 runs. The authentication service 23 returns 77 a created machine account 13 along with login credentials 15 for the account. The enrollment and policy module 29 records 79 the machine 19 as enrolled under the specified enrollment definition 49. This record is stored in a location accessible by other components of the embodiment of the invention.

The enrollment and policy module 29 returns 81 to the agent 25 the machine policies 39 specified by the machine policies list 53 in the enrollment definition 49. The enrollment and policy module 29 also returns 83 to the agent the login credentials 15 necessary to use the created machine account 13.

The machine 19 on which the agent 25 runs is now enrolled with an embodiment of the invention meaning that all processes 17 which run on that machine can now request an access token 21 from the agent 25 so that the processes 17 can access network resources for which they have permission to access.

Requesting and Using an Access Token for Network Resource Use

Figure 6A:
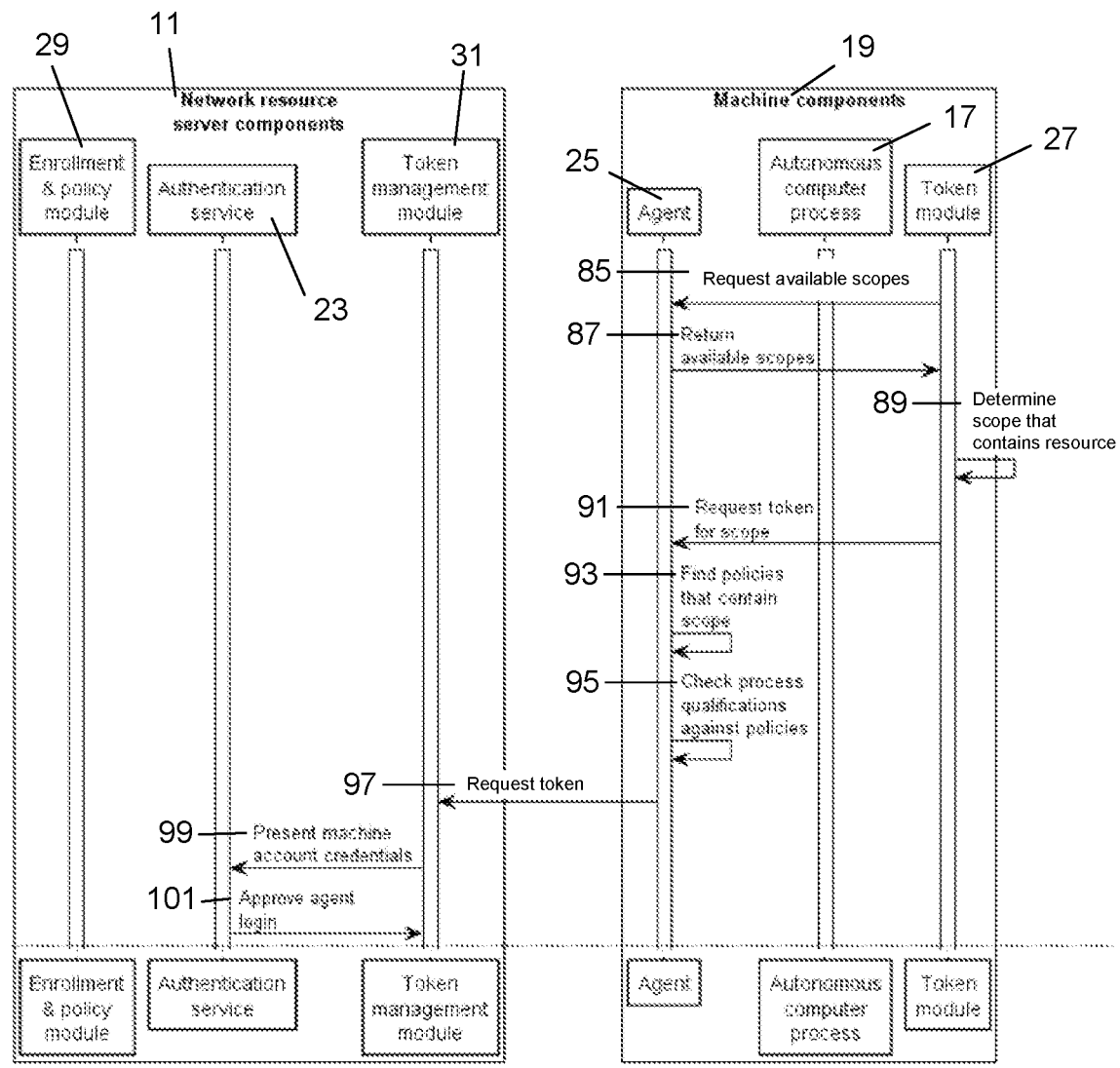
FIGS. 6*a* and 6*b* are consecutive block diagrams that show how an autonomous computer process uses an embodiment of the invention to request an access token for network resource use and then use the token to request resources.
Figure 6B:
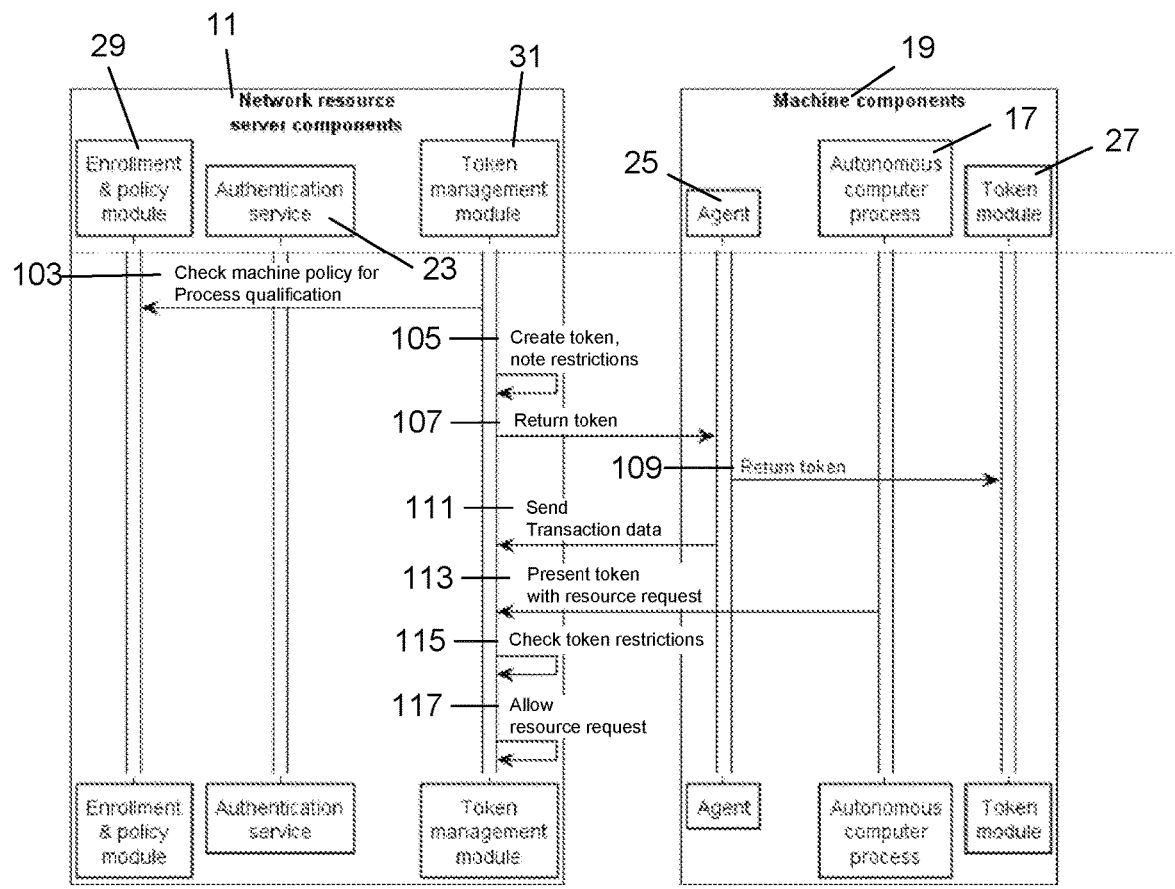

FIGS. 6a and 6b show how an autonomous computer process 27 running on a machine 19 in an embodiment of the invention requests an access token 21 to use in requesting a network resource from the network resource server 11.

If the token module 27, which is part of an autonomous computer process 17, does not know what resource scopes 35 are available on the machine 19 on which the process 17 runs, the token module 27 sends 85 a request to the agent 25 running on the same machine 19 for the resource scopes 35 available on the machine 19. The agent 25 returns 87 a list of available resource scopes 35 to the token module 27. The token module 27 determines 89 an available scope 35 that contains the desired resource. In another embodiment of the invention, the token module 27 may have available resource scopes 35 built in so that the token module 25 need not query the agent 25 for those scopes 35.

The token module 27 sends 91 a request to the agent 25 for an access token 21 that enables access to the resource scope 35. The agent 25 looks through its stored machine policies 39 to find 93 any policies 39 whose scope access definitions 43 specify the resource scope 35. If the agent 25 finds one or more policies 39 with scope access definitions 43 that specify the resource scope 35, the agent checks 95 the scope access definitions 43 to see if any of them contains scope restrictions 47 that allow the autonomous computer process 17 in which the token module 27 runs to access the requested scope 35.

If the agent 25 finds that the requesting process 17 is allowed access to the requested resource scope 35, the agent 25 requests 97 an access token 21 from the token management module 31 in the network resource server 11. In the request, the agent 25 provides the machine account credentials 15 for the machine 19 in which the agent 25 runs, the requested resource scope 35, and the qualifications of the requesting autonomous computer process 17. Those qualifications may include many different aspects of the process 17 that could include the process name, the location of the machine 19 on which the process 17 runs, the time of day when the process 17 requested resource access, and many other pieces of information.

The token management module 31 presents 99 the machine account credentials 15 to the authentication service 23 for verification. If the credentials 15 check out, the authentication service 23 approves 101 the agent's 25 login to the token management module 31. The authentication service 23 determines if the credentials are valid through security measures that may include simple factors such as username and password and more advanced factors such as machine location, time of day, or other authentication information.

The token management module 31 contacts 103 the enrollment and policy module 29 to check the machine policies 39 that apply to the requesting agent 25. The machine policies 39 determine if the requesting autonomous computer process 17 is qualified to request the specified resource scope 35. If the process 17 is qualified, the token management module 31 creates 105 an access token 21 and notes the resource scope 35 restrictions that apply to the token 21. The token management module 31 then returns 107 the access token 21 to the requesting agent 25. The agent 25 returns 109 the token 21 to the requesting token module 27 where the token 21 is now available to the autonomous computer process 17 in which the token module 27 runs. The agent 25 then sends 111 data about the agent's 25 entire transaction with the token module 27 to the token management module 31 so the token management module 31 can store the data for use later as an audit trail.

The autonomous computer process 17 requests 113 a resource through the token management module 31. The module 31 checks 115 its records to see what restrictions apply to the token 21. If the requesting autonomous computer process 17 meets those restrictions, the token management module 31 allows 117 the resource request to go through to the network resource server 11, which may then allow authorized resource use by the autonomous computer process 17. As a result, the machine 25 can then obtain requested resources from the network resource server which the machine has been authorized to access.

Modifying Machine Policies

Figure 7:
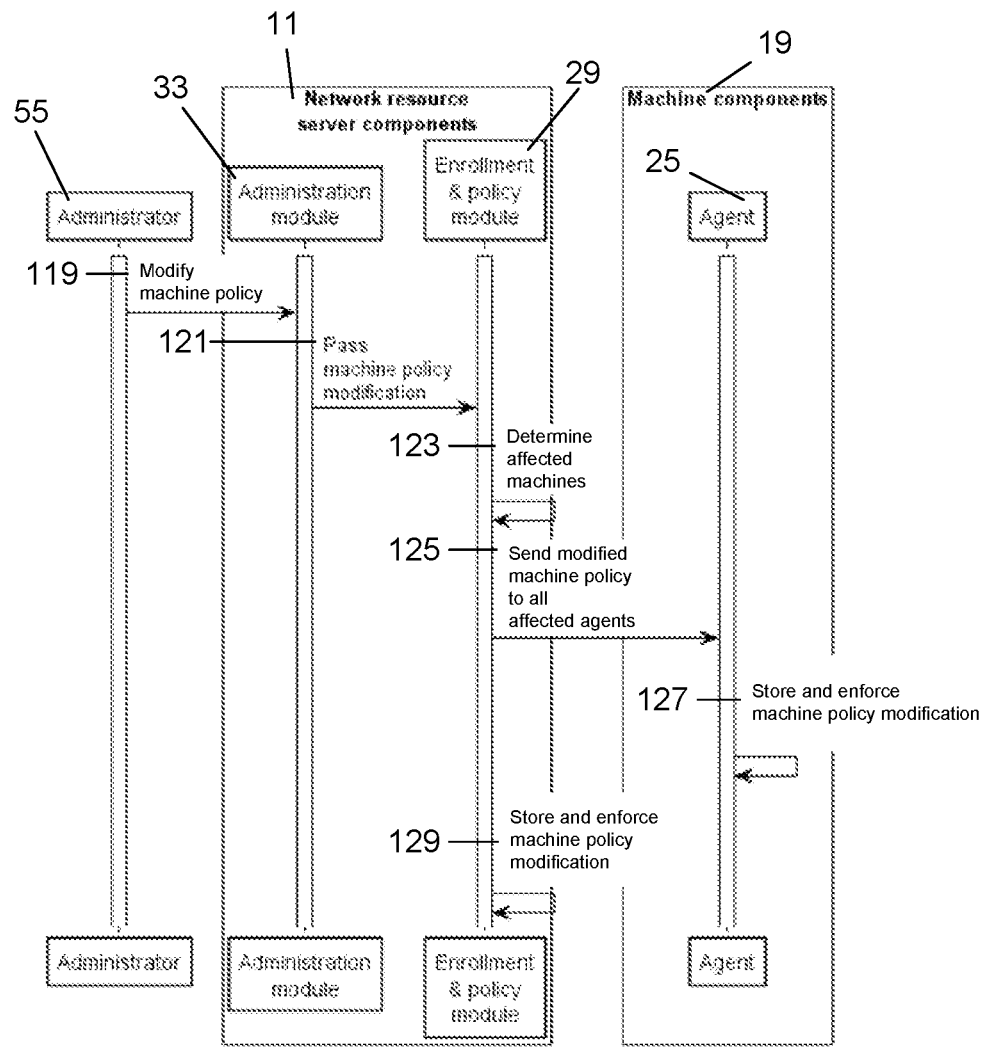
FIG. 7 is a block diagram that shows how an embodiment of the invention accepts modifications to machine policies and then propagates those modifications to affected agents.

FIG. 7 shows how an embodiment of the invention handles modified machine policies 39. The process begins with in this example with an administrator 55 using the administration module 33 to modify 119 an existing machine policy 39 by adding a new scope access definition 43 to the machine policy 39. This new definition 43 expands resources available through the machine policy 39 and defines additional scope restrictions 47 for machines 19 affected by the policy 39. Machine policy 39 modification can take many other forms such as adding a new policy 39 or deleting an existing policy 39.

The administration module 33 passes on 121 the machine policy 39 modifications to the enrollment and policy module 29 that handles and stores machine policies 39. The enrollment and policy module 29 determines 123 the machines 19 affected by machine policy 39 by reading the policy's 39 affected machines list 41. The enrollment and policy module 29 then sends 125 the machine policy 39 modification to the agents 25 on the affected machines 19.

The agent 25 on each affected machine 19 stores 127 the machine policy 39 modification and enforces those modifications whenever the agent 25 retrieves access token 21 requests from autonomous computer processes 17 on the machine.

The enrollment and policy module 29 also stores 129 the machine policy 39 modification and enforces the modifications whenever an agent 25 requests an access token 21.

Other Implementations of the Invention

The invention may be implemented in alternative ways. Embodiments of the invention may locate components together within a core or scattered across various locations, and they may consolidate multiple components within a single component that performs the same functions as the consolidated components. Embodiments may also split components into multiple components that work together to perform the same function.

Embodiments of the invention may use many different criteria for determining an application's qualifications for receiving an access token, including criteria which have not yet been invented. Embodiments of the invention may use account secrets other than account login credentials to authenticate account users, and may issue resource access components other than access tokens to allow access to resources.

Embodiments of the invention may differ in how they store, distribute, and enforce machine policies. Policies may be stored in one of the invention's network resource server components such as the token management module and not within the agent so that the agent queries the network resource server component for machine policies each time an autonomous computer process requests a token from the agent.

An embodiment of the invention may cache short-lived tokens on a token-requesting machine along with requirements for using the token. The agent on the machine may retrieve a token for a requesting autonomous computer process instead of contacting the network resource server for a token for each autonomous computer process token request.

An embodiment of the invention may be a machine-readable medium having stored thereon instructions which cause a processor to perform operations as described above. In other embodiments the operations might be performed by specific hardware components that contain hardwired logic. Those operations might alternatively be performed by any combination of programmed computer components and custom hardware components.

A machine-readable medium may include any mechanism for storing or transmitting information in a form readable by any type of processing device.

Although specific examples of how the invention may be implemented are described, the invention is not limited by the specified examples, and is limited only by the scope of the following claims.

The invention claimed is:

1. A system comprising:
   a network resource server including an administration module, an authentication service, a token management module and an enrollment and policy module;
   a plurality of machines communicatively coupled to said network resource server, each said machine including a plurality of autonomous computer processes configured to request resource access from said network resource server, a token module, and an agent;
   wherein said network resource server and said plurality of machines comprise one or more processors, and executable code stored on a non-transitory computer-readable storage media and executed by the one or more processors;
   wherein said agent in each of said plurality of machines is configured to enroll a corresponding one of said plurality of machines with said network resource server, and accept machine policies and login credentials from said enrollment and policy module, and after one of said plurality of machines is enrolled with said network resource server, if said token module does not know what resource scopes are available on the one machine, the token module issues a request to said agent on the one machine for available resource scopes and the agent returns a list of available resource scopes to the token module;
   wherein the token module determines an available one of said resource scopes that contains a resource for which access is requested by one of said autonomous computer processes running on said one of said plurality of machines;
   said token module requests from said agent an access token for the available one resource scope.

2. The system defined by claim 1 wherein said token module includes a set of available resource scopes available on said one machine.

3. The system defined by claim 1 wherein:
said agent requests an access token from the token management module by providing machine account credentials for the one machine, the requested resource scope from said set of available resource scopes, and qualifications of the autonomous computer process containing the requesting token module.

4. The system defined by claim 3 wherein said qualifications include aspects of the autonomous computer process which include at least one of a process name, a location of the one machine, and a time of day when the autonomous computer process requested said resource access.

5. The system defined by claim 3 wherein the token management module presents the one machine account credentials to the authentication service for verification, and if verified, the authentication service approves the login credentials obtained from the agent to the token management module.

6. The system defined by claim 5 wherein the authentication service determines if the one machine account credentials are valid through security measures which include at least one of username and password, machine location, and time of day.

7. The system defined by claim 5 wherein the token management module contacts the enrollment and policy module to check policies of the one machine that apply to the agent, and the machine policies determine if the autonomous computer process of the one machine is qualified to request the resource scope and if the autonomous computer process of the one machine is qualified, the token management module creates an access token with resource scope restrictions that apply to the access token and returns the access token to the agent to return the access token to the token module so that the access token is available to the autonomous computer process of the one machine.

8. The system defined by claim 7 wherein the autonomous computer process containing said token module presents the received access token with resource scope restrictions that apply to the access token to the token management module which checks the access token restrictions and selectively allows the resource request.

9. The system defined by claim 7 wherein the autonomous computer process of the one machine requests a resource through the token management module which determines the restrictions that apply to the access token, and if the requesting autonomous computer process meets said restrictions, the token management module allows the resource request to access the network resource server for authorized resource use by said autonomous computer process of the one machine.

10. The system defined by claim 1 wherein the administration module receives from an administrator a request to modify an existing machine policy by adding a new scope access definition to the machine policy to add resources available through the machine policy and define additional scope restrictions for machines affected by the machine policy, the administration module passing the machine policy modifications to the enrollment and policy module, the enrollment and policy module determining the machines affected by the machine policy by reading an affected machines list, the enrollment and policy module sending the machine policy modification to corresponding agents on the affected machines list, which corresponding agents store the machine policy modification on a corresponding machine.

11. The system defined by claim 10 wherein the machine policy modification includes adding a new policy or deleting an existing policy.

12. The system defined by claim 10 wherein the enrollment and policy module stores the machine policy modification and enforces the machine policy modification.

13. The system defined by claim 1 wherein said agent is configured to enroll said corresponding one of said plurality of machines with said network resource server by presenting an enrollment code to the enrollment and policy module along with information specific to said one machine, wherein the enrollment and policy module finds an enrollment definition that matches the presented enrollment code and verifies the enrollment request is legitimate by checking the provided machine-specific information against enrollment qualifications specified in said enrollment definition;
wherein if the enrollment request is legitimate, the enrollment and policy module requests a machine account from the authentication service for the one machine and the authentication service returns a created machine account along with login credentials for the created machine account and stores a record that the one machine is enrolled under the enrollment qualifications specified in the enrollment definition;
wherein said enrollment and policy module returns to the agent the machine policies specified by a machine policies list in the enrollment definition and returns to the agent said login credentials necessary to use the created machine account.

14. The system defined by claim 13 wherein said administration module receives an enrollment definition created by an administrator and passes said enrollment definition to said enrollment and policy module which stores said enrollment definition to verify the agent of the one machine when presenting said enrollment code to the enrollment and policy module.

15. The system defined by claim 13 wherein said enrollment code is embedded within said agent.

16. The system defined by claim 13 wherein said agent obtains said enrollment code provided by an administrator external to said machine.

17. The system defined by claim 13 finds said enrollment code previously stored on said one machine.

* * * * *